United States Patent [19]

Hähn et al.

[11] Patent Number: 4,645,651
[45] Date of Patent: Feb. 24, 1987

[54] METHOD OF PRODUCING VANADIUM COMPOUNDS FROM VANADIUM-CONTAINING RESIDUES

[75] Inventors: Reinhard Hähn, Schwabach-Limbach; Hans Hess; Siegfried Sattelberger, both of Nuremberg, all of Fed. Rep. of Germany

[73] Assignee: GFE Geselschaft für Elektrometallurgie mbH, Dusseldorf, Fed. Rep. of Germany

[21] Appl. No.: 692,022

[22] Filed: Jan. 16, 1985

[30] Foreign Application Priority Data

Jan. 25, 1984 [DE] Fed. Rep. of Germany ....... 3402357

[51] Int. Cl.$^4$ ............................................. C01G 31/00
[52] U.S. Cl. ......................................... 423/62; 423/68
[58] Field of Search ................................... 423/62, 68

[56] References Cited

U.S. PATENT DOCUMENTS

| 831,280 | 9/1906 | Handy | 423/68 |
|---|---|---|---|
| 2,187,750 | 1/1940 | Marvin | 423/62 |
| 3,792,150 | 2/1974 | Maxwell et al. | 423/62 |
| 4,087,510 | 5/1978 | Steenken | 423/62 |
| 4,389,378 | 6/1983 | McCorriston | 423/62 |
| 4,420,464 | 12/1983 | Barclay | 423/62 |
| 4,472,360 | 9/1984 | McCorriston | 423/68 |
| 4,477,416 | 10/1984 | Goddard | 423/62 |

*Primary Examiner*—H. T. Carter
*Attorney, Agent, or Firm*—Karl F. Ross; Herbert Dubno

[57] ABSTRACT

A method of treating high vanadium solid petroleum residues which tend to become environmental pollutants when disposed of in landfills in which the residue is fused with sodium carbonate, sodium sulfate and/or sodium chloride and the resulting melt material is treated with an aqueous phase which can contain sodium carbonate to form a vanadate solution from which ammonium polyvanadate, sodium ammonium vanadate or ammonium metavanadate can be precipitated.

4 Claims, No Drawings

METHOD OF PRODUCING VANADIUM COMPOUNDS FROM VANADIUM-CONTAINING RESIDUES

FIELD OF THE INVENTION

My present invention relates to a method of recovering useful vanadium compounds from vanadium-containing residues and, more particularly, to a method of recovering vanadium compounds from petroleum residues.

BACKGROUND OF THE INVENTION

Petroleum residues, as is well known, may contain significant quantities of vanadium which it may be desirable to recover, whether for the value of the vanadium or to avoid environmental pollution and indeed such residues can provide a valuable source of vanadium for the production of various vanadium compounds.

Such residues are generally solid residues of cracking, refining combustion or gasificatiion processes and generally is in the form of a high vanadium refractory solid composition.

It is known to recover vanadium compounds from such residues by mechanically comminuting the residue and treating the comminuted material with alkali compounds by a heating process in a heating furnace having an oxidizing atmosphere. The material which results from this treatment can be leached or extracted with water and vanadium compounds recovered from the leaching liquor which thus results. The vanadium containing residues can contain 10-60% by weight $V_2O_5$, 3-15% by weight nickel and 4-40% by weight MgO, as well as substantial quantities of carbon, sulfur, calcium and silicon.

The customary process used heretofore carries out the heating in the form of a roasting. The product which is withdrawn from the roasting furnace contains significant amounts of impurities which preclude the effective refinement of the product to a useful vanadium compound, i.e. precludes the recovery of a potassium metavanadate, vanadium pentoxide or vanadyl oxalate from the roasted composition.

Indeed, the production of pure vanadium compounds and especially these compounds are useful in the chemical industry, for example in the production of catalysts for sulfuric acid, phthalic acid and maleic acid synthesis, are useful in the ceramics industry for the generation of dyestuffs, pigments, coloring agents and enamels, and are useful for various metallurgical applications where high purity vanadium compounds are advantageous as, for example, where vanadium pentoxide is used in alloying in steel, e.g. for ferro alloys.

In order to supply such needs of high purity vanadium compounds, a technology has been developed in which vanadium raw materials such as titanomagnetite slag is used and is subjected to a number of relatively expensive and time-consuming purification steps.

In this technology and in other vanadium compound production systems, in which a multiplicity of stages are carried out, waste water is generated which represents a burden upon the environment even if there has been complete or practically complete removal of heavy metals from the waste water. The waste water continues to contain large quantities of neutral salts which are disadvantageous when discharged into bodies of water because of the overall increase in the salinity even where no added danger is provided by heavy metal discharge.

At the same time as the disadvantages of recovering vanadium and its compounds from metallurgical products have become increasingly significant, the accumulation of vanadium-containing wastes from the treatment and combustion or firing of petroleum has become a problem. Indeed, the processing of Central America crudes especially have given rise to environmental problems because of the high heavy metal and especially vanadium content of the petroleum processing residues.

Landfill disposal of these residues is not possible without pretreatment because at least in part the residues can be leached by ground water to release water-soluble heavy metal compounds.

Indeed, the chemical and ceramic industries, as well as specialty metallurgical applications require certain vanadium compounds, namely, ammonium polyvanadate in moist or dry form, sodium ammonium vanadate as wet cake, and ammonium metavanadate, potassium metavanadate, vanadium pentoxide and vanadyloxalate as solutions.

In the past, such compounds had to be fabricated from such known raw materials as titanomagnetites or the slags thereof are required generally the following sequence of steps:

comminution and milling of the slag;

alkali oxidizing roasting;

leaching out of the sodium vanadate thus produced;

purification to separate out, for example $SiO_2$ and Fe;

precipitating out sodium-ammonium vanadate (SAV);

solubilizing the SAV and precipitating out ammonium polyvanadate (APV); and solubilizing the APV and precipitating out $NH_4VO_3$.

All in all, therefore, the processes involved in producing useful vanadium compounds in accordance with prior art technology were inordinately complex and expensive to carry out and did not and are not able to eliminate the drawbacks of high production of waste water and accumulation of petroleum treatment residues with high heavy metal content.

In the conventional processes for the handling of vanadium-containing crude oils, whether by coking, demetallizing, cracking, gasification or combustion, vanadium-containing solid residues are obtained which cannot, as has already been noted be disposed of in landfills or the like.

Conventional processes for treating such residues have included the following: mixing the vanadium-containing solid residues with vanadium oxides and subjecting them to alumino-thermic reduction in electric furnaces to recover FeV (ferrovanadium). This product, however, because of its high content of S, C, Ni, Si and Mg, is considered to be of low grade and second quality so that direct use in metallurgical processes is frequently counterindicated.

The vanadium residue can be subjected to acid treatment with subsequent separation of the vanadium by precipitation or extraction. The problem with this is that a strongly acid waste water is obtained which, because of its heavy metal and salt content, i.e. its content of nickel, iron, aluminum and magnesium sulfate, may be as detrimental to the environment as landfills of the residue or even more detrimental. In any event, the cost of treating such waste water is prohibitive.

The vanadium residues have also been cut with titanomagnetites and slag and have been subjected to roasting utilizing the process previously described for the recovery of vanadium from metallurgical residues. This, however, requires the substantial dilution of the high vanadium-containing residues for roasting since with vanadium content in excess of 7% in the residue, the alkali salt treatment is not effective.

OBJECTS OF THE INVENTION

It is the principal object of the present invention, therefore, to provide an improved method of making high purity vanadium compounds which can be utilized in a variety of industries and wherein the fabrication of the vanadium compounds can be effected at low cost and by a less complicated sequence of steps than was required heretofore.

Another object of our invention is to reduce the waste water treatment problems hitherto encountered in vanadium-compound fabrication.

Still another object of this invention is to provide a method which eliminates the disposal problem hitherto encountered with petroleum residues containing high concentrations of vanadium.

DESCRIPTION OF THE INVENTION

These objects and others which will become apparent hereinafter are attained, in accordance with the present invention, in a process for the treatment of the solid vanadium-containing petroleum residues previously described wherein the comminuted vanadium-containing residue is mixed with a superstoichiometric quantity of at least one substance from the group which consists of alkali-metal carbonates, alkali-metal sulfates, alkali-metal chlorides and mixtures thereof, the resulting mixture being heated to a temperature above the melting point thereof so as to transform the mixture to a melt.

The melt material is then treated with an aqueous phase to leach out vanadium and form a vanadate solution. Silicates and soluble iron compounds are then removed from the vanadate solution and the thus purified vanadate solution is treated to precipitate at least one vanadium compound selected from the group which consists of alkali-metal vanadates, alkali-earth-metal vanadates and ammonium vanadates.

The alkali metal referred to may advantageously be sodium or potassium and is preferably sodium.

The aqueous phase which is used can be water or water to which sodium carbonate has been added.

The preferred precipitated vanadate is ammonium polyvanadate and/or sodium ammonium vanadate and/or ammonium metavanadate.

The treatment of the melt material can be effected in liquid form by finely dispersing it in the water or water-containing sodium carbonate, e.g. by spraying it into the water.

Alternatively, the melt material can be solidified, broken-up and milled or ground and then mixed with the water or water-containing sodium carbonate.

In the leaching step using the aqueous phase, we have found it to be advantageous to separate the vanadate solution from insoluble solids by means of a filter press or drum filter. Furthermore, we have found it to be advantageous to utilize the precipitated ammonium polyvanadate and/or sodium ammonium vanadate and/or ammonium metavanadate for the production of other vanadium compounds, namely, the potassium vanadate and/or vanadium pentoxide and/or vanadyl oxalate.

The mechanical preparation of the residue according to the invention can advantageously be effected by a grinding or milling to produce a particle size distribution which is optimum for the particular residue and has the further advantage that it allows the screening out of foreign materials. The optimum particle size can be determined empirically, but in all cases we have found that a particle size of less than 25 mm is most advantageous and that an optimum particle size range will usually be between 0.5 mm and 20 mm.

The reference to a "superstoichiometric" quantity of alkali carbonate and/or alkali sulfate and/or alkali chloride, means a quantity of the alkali salt in excess of that theoretically required to solubilize all of the vanadium in solution.

The alkali salt component is preferably intensively mixed with the comminuted vanadium-containing residue at a temperature above the melting temperature of the resulting mixture in an oxygen-containing furnace atmosphere and directly in the furnace which will then be used to heat the mixture, e.g. in a crucible, to a temperature at least equal to its melting point.

Apparently the transformation of the vanadium into a water-soluble form commences in the mixture even before the melting point is reached and goes to completion in the melt, the further heavy metals of the residue remaining in the melt in a water insoluble form.

The preferred apparatus for the melting step is a short-drum furnace although other furnace types can be used.

The leaching step with the aqueous phase can be carried out without difficulty by the techniques described, although we should not that a preferred way of ensuring intimate contact with the milled or ground solidified melt material is by kneading or milling with the aqueous phase.

Regardless of how the leaching is carried out, the separation of the vanadate solution from the insolubles can be effected without difficulty on a filter press or drum filter.

Silicate and soluble iron compound removal can be effected by any conventional technique from the solution and further description of this step is not necessary.

The solution can then be treated with ammonium sulfate and the pH adjusted to precipitate out the desired product.

Naturally, by controlling the temperature pH value, ammonium salt content and like parameters, any of the preferred products can be obtained with ease.

In practice, we have found it to be possible to obtain these products with the following impurity levels: compounds are given only in terms of the vanadium content to show the degree of purity:

|    | ammonium-meta-vanadate | ammonium-poly-vanadate | sodium-ammonium-vanadate |
|----|------------------------|------------------------|--------------------------|
| V  | 43.5%                  | 50.5%                  | 40.5%                    |
| Na | 0.01%                  | 0.03%                  | 3.8%                     |
| Fe | 0.005%                 | 0.005%                 | 0.006%                   |
| Si | ca. 0.01%              | 0.01%                  | 0.004%                   |
| Cr | 0.001%                 | 0.001%                 | 0.001%                   |
| Ni | 0.001%                 | 0.001%                 | 0.001%                   |
| P  | 0.005%                 | 0.005%                 | 0.005%                   |

It should also be understood that in the sodium ammonium vanadate, sodium is not an impurity but is a component of the compound.

The transformation of these compounds to potassium metavanadate, vanadium pentoxide and vanadium oxalite, can be effected utilizing conventional techniques.

SPECIFIC EXAMPLES

Example 1

5 kg of vanadium containing electrostatic filter ash as the solid residue with the following composition:
V=4.25%
Ca=4.2%
Mg=3.6%
C=1.4%
S=20.5%
Ni=2.5% as combined with 5 kg of soda (sodium carbonate) intimately and heated to a temperature of about 950° C. to form a homogeneous melt. This melt is then cooled to solidify it and form a melt material, is milled and is kneaded with 6 l of water at 90° C.

The resulting suspension is filtered and the filter cake is repeatedly washed with a total of 1 l of hot water. The filtrate and washings are combined to form a vanadate solution which is conventionally desilicated and is heated to about 95° C. and reacted with 465 grams of solid $(NH_4)_2SO_4$. The pH is adjusted with sulfuric acid to 2.1 under vigorous stirring to precipitate ammonium polyvanadate. The precipitate is filtered off and is washed with water until the water is free from neutral salts and is dried. The product has the following composition:
V=50.97%
Fe=0.005%
Si=<0.01%
Ni=0.001%
$Na_2O$=0.047%
Cr=0.011%
The yield was 84%.

Example 2

60 kg of vanadium-containing fly ash with the following composition:
V=7.83%
Ca=2.2%
Mg=6.3%
C=17.4%
S=9.1%
Ni=0.8% is blended with 70 kg $Na_2CO_3$ and 20 kg $Na_2SO_4$ and the mixture is melted at 960° C. and held at this temperature for two hours with stirring. The liquid melt is then fed to a high-pressure water jet in a sharp stream to suspend the resulting melt material in 170 l of water.

The resulting suspension is freed from solids in a filter press and the filter cake is washed a number of times with a total of 12 l of hot water until it is practically free from vanadium. The resulting vanadate solution is desilicated and treated with 8.7 kg of solid $(NH_4)_2SO_4$ and the solution is heated to 95° C.

The solution is pumped into a second vessel containing a stirrer in which sulfuric acid is constantly metered to maintain the pH between 1.8 and 2.5. Ammonium polyvanadate precipitates out and after the full amount of the vanadate solution is treated, the suspension is stirred for another 15 minutes, whereupon the ammonium vanadate is filtered off, washed free from neutral salts and dried. The analysis of this product was as follows:
V=50.35%
Fe=0.004%
Si=<0.01%
Ni=0.008%
$Na_2O$=0.08%
$K_2O$=0.04%

Example 3

100 kg of vanadium-containing Economizer residue of the following composition:
V=14.60%
Ca=2.8%
Mg=12.8%
C=7.7%
S=2.6%
Ni=4.8% is treated with 85 kg $Na_2CO_3$ and 20 kg $Na_2SO_4$ and heated to 970° C. to form a homogeneous melt. After cooling and solidification, the melt material is broken-up, ground and dispersed in 200 l at 90° C. After sedimentation of the solids, a clear vanadate solution is decanted and the residue is again dispersed in 170 l of hot water. The solids then settle and the vanadium solution is decanted. The residue is delivered to a filter press and washed with an additional 70 l of hot water. The decantates and filtrates are combined, desilicated and cooled to a temperature of about 25° C. The solution is pumped into a vessel in which it is stirred together with 40 kg $NH_4SO_4$ dissolved about 100 l of cold water previously contained in this vessel. The ammonium metavanadate precipitated out and stirring was halted after 5 hours. The solids were permitted to settle and the mother liquid decanted off. The solids were then subjected to suction filtration, washed and dried in a fluidized bed. The ammonium metavanadate had the following analysis:
V=43.5%
$Na_2O$=0.016%
$K_2O$=0.012%
Fe=0.0017%
Si=0.011%
Cr=0.001%
P=0.004%
Ni=0.0002%
The yield was 89%.

When the same melt material treated with a 2% soda solution under otherwise similar conditions, the yield was increased by about 3% to about 92%.

Example 4

100 kg of vanadium-containing bottom ash with the following composition:
V=19.24%
Ca=1.35%
Mg=11.7%
C=1.4%
S=4.0%
Ni=8.1% is comminuted to a particle size below 10 mm and treated with 45 kg $Na_2CO_3$ and 20 kg $Na_2SO_4$, the mixture being heated to about 930° C. to form a homogeneous melt.

The molten material is poured in a thin stream directly into 0.5 $m^3$ of cold water with intense stirring. After a stirring time of about 3 hours, the solids were allowed to sediment and the clear supernatent solution was decanted.

The solids were then washed with an addition 50 l of water at 70° C. The washing solution was then decanted and the decantates combined, desilicated and cooled below 30° C. The thus produced solution was treated with about 160 l of a 35% aqueous $(NH_4)_2SO_4$ solution.

This mixture is stirred for about 6 hours to allow crystallization of ammonium metavanadate.

After settling of the crystals, the clear waste water is decanted. The solids are dried on a band filter, washed with cold water, freed from adherent water on a vacuum filter and dried in a drying chamber. The ammonium metavanadate had the following analysis:

V=43.4%
$Na_2O$=0.08%
$K_2O$=0.01%
Ni=<0.001%
Fe=0.002%
Si=0.01%
P=0.003%
Cr=0.001%

The yield in this example was 85%.

Example 5

500 kg of a vanadium-containing petroleum residue formed by the gasification of high vanadium petroleum crude of the following composition:

V=23.54%
Ca=1.2%
Mg=0.8%
C=0.3%
S=6.0%
Ni=12.1%, after comminution, to a particle size below 20 mm and preferably between 0.5 and 10 mm, is combined with 250 kg $Na_2CO_3$ and 50 kg $Na_2SO_4$. The resulting product is melted by heating to a temperature of 900° C. to form a homogeneous melt. The latter was cooled to produce a solid melt material and after cooling was broken up and ground.

The ground product is stirred into 1.5 $m^3$ of hot water at 85° C. After settling of the solids, the clear supernatant liquid is drawn off and the solid residue again mixed with 1 $m^3$ hot water and immediately sugjected to filter pressing with subsequent washing with 0.2 $m^3$ of warm water. The decantates and washing filtrate are combined, desilicated and cooled to 25° C. After addition of 350 kg of solid $(NH_4)_2SO_4$ and adjustment of the pH to 5.2 to 5.4, the solution was stirred for 8 hours unstirred. Large crystals of sodium ammonium vanadate precipitate out and this product is separated from the mother liquid in a thickener, freed from the liquid phase in a centrifuge and washed with cold water. The product contained 13.1% $H_2O$ and the analysis of the dry substance was:

V=40.37%
Si=0.004%
Fe=0.006%
P=0.006%
Cr=0.001%

The yield amounted to 86%.

In the foregoing examples and compositions, the vanadium compounds are given only in terms of the vanadium content thereof, nitrogen and oxygen making up the balance of 100% in each case.

We claim:

1. A method of recovering vanadium from a vanadium-containing solid petroleum residue which comprises the steps of:

combining solid petroleum residue in a comminuted form with a superstoichiometric quantity of a mixture of sodium carbonate and sodium sulfate to form a composition;

heating said composition to a temperature at least equal to a melting point thereof to form a melt of said composition and constituting a melt material therefrom;

solidifying said melt material and breaking up and grinding said melt material;

mixing said melt material with an aqueous phase comprising water or water containing sodium carbonate to leach said melt material and produce a vanadate solution; and precipitating at least one compound selected from the group which consists of ammonium polyvanadate, sodium ammonium vanadate and ammonium metavanadate from said vanadate solution.

2. The method defined in claim 1 wherein said melt material is finely dispersed in said aqueous phase.

3. The method defined in claim 1 wherein said melt material is treated with said aqueous phase at least in part on a filter press.

4. The method defined in claim 1 wherein said melt material is treated with said aqueous phase at least in part in a drum filter.

* * * * *